(12) United States Patent
Wasser et al.

(10) Patent No.: US 12,281,676 B2
(45) Date of Patent: Apr. 22, 2025

(54) SYNCHRONIZATION OF A CLUTCH FOR MANUAL OPERATION OF AN ACTUATOR

(71) Applicant: AUMA Riester GmbH & Co. KG, Müllheim (DE)

(72) Inventors: Tobias Wasser, Freiburg (DE); Girish Panakanahalli Ningaiah, Karnataka (IN); Kiran Krishnegowda, Karnataka (IN); Atiqh Ahmed Mohammed, Telangana (IN)

(73) Assignee: AUMA Riester GmbH & Co. KG, Müllheim (DE)

( * ) Notice: Subject to any disclaimer, the term of this patent is extended or adjusted under 35 U.S.C. 154(b) by 0 days.

(21) Appl. No.: 18/561,375

(22) PCT Filed: Oct. 19, 2021

(86) PCT No.: PCT/EP2021/079009
§ 371 (c)(1),
(2) Date: Nov. 16, 2023

(87) PCT Pub. No.: WO2022/242890
PCT Pub. Date: Nov. 24, 2022

(65) Prior Publication Data
US 2024/0369110 A1     Nov. 7, 2024

(30) Foreign Application Priority Data
May 21, 2021    (CN) .......................... 202110555650.2

(51) Int. Cl.
*F16D 11/14*    (2006.01)
*F16D 21/06*    (2006.01)
(Continued)

(52) U.S. Cl.
CPC .............. *F16D 11/14* (2013.01); *F16D 21/06* (2013.01); *F16K 31/047* (2013.01); *F16K 31/05* (2013.01)

(58) Field of Classification Search
CPC .......... F16D 11/10; F16D 11/14; F16D 21/06; F16D 43/206; F16K 31/05; F16K 31/047
(Continued)

(56) References Cited

U.S. PATENT DOCUMENTS 4,034,624 A * 7/1977 Bianchini ............... F16K 31/05
                                                 192/48.91
4,562,908 A   1/1986 Zouzoulas
(Continued)

FOREIGN PATENT DOCUMENTS

CN    109058316    12/2018
CN    109857187    6/2019
(Continued)

*Primary Examiner* — Richard M Lorence
(74) *Attorney, Agent, or Firm* — Volpe Koenig

(57) ABSTRACT

For improving manual operation of an actuator (1), a novel clutch (4, 6) is proposed that features at least one movable protrusion (12) that is axially movable along a coupling axis (11) of the clutch (4, 6) relative to an element (8) that carries the protrusion (12). This design has the advantage that engagement of the clutch (4, 6) is possible under all circumstances, even in cases in which the protrusion (12) is not yet in a correct rotational coupling position (18) (cf. FIG. 7), as the protrusion (12) can be transferred into the coupling position (18) by a rotational movement (24, 25) at all times.

21 Claims, 4 Drawing Sheets

(51) Int. Cl.
*F16K 31/04* (2006.01)
*F16K 31/05* (2006.01)

(58) Field of Classification Search
USPC .......................................... 74/625; 192/48.91
See application file for complete search history.

(56) References Cited

U.S. PATENT DOCUMENTS

2006/0081800 A1* 4/2006 Riester .................... F16K 31/05
   251/129.01
2010/0089685 A1 4/2010 Quehenberger et al.

FOREIGN PATENT DOCUMENTS

DE 1524593 11/1970
GB 1567369 5/1980

* cited by examiner

SYNCHRONIZATION OF A CLUTCH FOR MANUAL OPERATION OF AN ACTUATOR

CROSS-REFERENCE TO RELATED APPLICATIONS

This application is a 371 National Phase of International Application PCT/EP2022/079009, filed Oct. 19, 2021, which claims priority from Chines Patent Application No. 2021105556650.2, filed May 21, 2021, both of which are incorporated herein by reference as if fully set forth.

TECHNICAL FIELD

The present disclosure concerns a clutch comprising a coupling element and a counter coupling element, wherein the coupling element and the counter coupling element are movable relative to each other in a first axial movement to engage or disengage. Secondly, the disclosure concerns an actuator for actuating a control element such as a valve by a driven member of the actuator. This actuator comprises a drive motor, a handwheel, a motor clutch for interrupting a first drivetrain from the drive motor to the driven member, and a handwheel clutch for interrupting a second drivetrain from the handwheel to the driven member.

In addition, the disclosure concerns accompanying methods, namely a first method for engaging a coupling element and a counter coupling element of a clutch; and also a method for switching between two drivetrains of an actuator that features a drive motor and a driven member that can be driven by the drive motor.

BACKGROUND

In process technology plants, liquids, gases, vapors, and granulate need to pass through pipelines. Industrial valves are used to inhibit or release such medium flow as well as to control the resulting flow rate by opening or closing the valves. Actuators as introduced above can be remotely controlled from a control room to operate such valves safely.

Typically, such actuators require a control signal and a source of energy. The control signal may be relatively low energy and an electric voltage or current, pneumatic, or hydraulic fluid pressure, or even human power. The main energy source of the actuator may be an electric current, hydraulic pressure, or pneumatic pressure.

When the actuator receives a control signal, it responds by converting the source's energy into mechanical motion, thus controlling the control element. Actuators may be used for the automation of valves: they can provide multi-turn actuation, in particular at variable speeds, or automatic, in particular electrically operated movement at a swing angle of less than 360° or linear movements for actuating a particular control element.

To allow safe actuation in emergency cases but also to allow manual operation of the actuator, e.g. during standard maintenance and during installation of the actuator at a plant, state-of-the-art electric actuators typically comprise a handwheel for manually operating the actuator. In this case, the user provides the source of energy for driving the actuator, i.e. the valve attached to the actuator may be actuated manually during commissioning, assembly, or maintenance.

In normal operation, the handwheel is declutched and thus not connected to the drivetrain. In an emergency case or during maintenance, in particular when the drive motor is switched off, the handwheel can be connected to the drivetrain by a handwheel clutch, thus allowing a manual-drive-mode in which the driven member (and thus the valve for example) can be manually operated using the handwheel.

State-of-the-art actuators typically use dog clutches for this purpose. A dog clutch (also known a dog gears) is a type of clutch that couples two rotating shafts or other rotating components not by friction but by interference or clearance fit. The two parts of the clutch are designed such that one will push the other, causing both to rotate at the same speed. While such a design offers the advantage of a power transmission through the clutch without slip, there may occur situations in which an operator cannot quickly engage the two parts of the clutch, because they are in an unsuitable relative rotational position. This poses a severe security issue, as the manual-drive-mode may not easily be available at all times without a prior repositioning of the handwheel's and/or the dog's respective rotational position(s) (relative to each other).

SUMMARY

Starting from this background, it is an object of the current invention to increase the security of operation of such a manual-drive mode. In particular, it is desirable that the handwheel can be connected to the drivetrain of the actuator under all circumstances.

In accordance with the present invention, a clutch is provided having one or more of the features disclosed herein, which solves the afore-mentioned problem, as the clutch may be used as a handwheel clutch for coupling a handwheel to the drivetrain of an actuator. In particular a clutch as introduced at the beginning is proposed, which, in addition, is characterized in that the clutch comprises a protrusion that can perform a second axial movement independent of the first axial movement (leading to the engagement or disengagement between the coupling element and the counter coupling element). In other words, this protrusion can perform the second axial movement, when either (or both) of the coupling elements are at rest.

Such a clutch may be used, in particular, for interrupting a drivetrain from a handwheel to a driven member of an actuator featuring a drive motor, as will be outlined below. The same clutch can also be designed to allow transmission of a force and/or torque from a drive motor of the actuator to the driven member, as will be explained in greater detail below.

The clutch proposed herein can be understood as a mechanical device that engages and disengages a power transmission, especially from a drive shaft (driving member) to a driven shaft (driven member); the driven member can thus provide an output power for actuating the control element, and it may have the form of an output shaft. The driving member can be part of a transmission, that is driven by a drive motor (in case of a motor clutch); or the driving member may be handwheel, for example (in case of a handwheel clutch).

The protrusion that performs the second axial movement (movable protrusion) may be designed in various shapes; for example, the clutch may feature, for example, two such movable protrusions that can perform the second axial movement (either together in unison or independent from each other) or it can have only one such movable protrusion. In the case of using two movable protrusions, it is preferable if these protrusions are positioned within two opposing half-spaces divided by a plane that encompasses a coupling axis of the clutch. Thereby higher torques may be transmitted by the clutch safely.

In some advantageous embodiments, the protrusion may be axially oriented, for instance like a dog of a dog clutch.

A major advantage of such a clutch is that—due to the additional freedom of degree provided by the second axial movement—the clutching and declutching can be done independent of any accidental rotational position of the coupling element or the counter coupling element, as will become apparent from further explanations below. In other words, the clutch can be operated under all circumstances, in particular independent of an actual rotational position of one of the coupling elements, in particular a coupling element connected to a drivetrain of an actuator.

There exist further advantageous embodiments solving the aforementioned problems, which are described in the sub-claims and in the following:

For example, it is generally suggested that the coupling element and/or the counter coupling element is/are movable into an axial engagement position by the first axial movement.

For example, according to a first embodiment, the counter coupling element may be axially non-movable/fixated (i.e. arrested in adjustment/non-adjustable); in this particular case, the coupling element may be moved relative to the counter coupling element into the axial engagement position.

According to a second embodiment, the coupling element may be axially non-movable/fixated; in this case, the counter coupling element may be moved relative to the coupling element into the axial engagement position.

These two embodiments may also be mixed, in which case both elements can be axially moved, such that the first axial movement may be split up in an axial movement of the counter coupling element and an axial movement of the coupling element (typically, these two movements may occur in opposite directions).

Concerning the (at least one) movable protrusion, this protrusion may be movable into an axial engagement position by the second axial movement. By performing this second engagement movement of the movable protrusion, a force and/or torque may be transmitted (or at least it may be transmittable) between the two elements of the clutch, as soon as the protrusion is in the axial engagement position. In other words, it is preferable if the force and/or torque can be transmitted via the protrusion from one coupling element to the other.

Seen from a different angle, a transmission of a force and/or a torque that is delivered from the counter coupling element to the coupling element via the protrusion (or vice versa) can be interrupted by disengaging the coupling element from the counter coupling element. Depending on the relative rotation position between the counter coupling element and the coupling element, the first axial movement can thus lead directly to engagement of the two elements (in case the protrusion is already in the engagement position); or the disengagement can be achieved by a movement of the protrusion into the engagement position after axial movement of the two elements (relative to each other), in particular after relative rotation between the coupling element and the counter coupling element.

The (at least one movable) protrusion may thus be designed for direct engagement with the coupling element. In this particular case, the protrusion may be carried by the counter coupling element and/or the protrusion may be movable relative to the counter coupling element.

As an alternative, the protrusion may also be designed for direct engagement with the counter coupling element. In this particular case, the protrusion may be carried by the coupling element and/or the protrusion may be movable relative to the coupling element.

These two alternatives may also be used together, in which case the clutch will comprise two movable protrusions, a first protrusion being relatively movable to the coupling element and a second protrusion being relatively movable to the counter coupling element.

These two protrusions may also be used together to achieve engagement of the two coupling elements, i.e. the two protrusions can transmit a force and/or a torque from protrusion to protrusion. In such a case, there may be (in some designs) no direct interference between a protrusion and the corresponding opposing coupling element.

The clutch can also further comprise a handwheel. This handwheel may be non-rotatably connected to the counter coupling element or the coupling element, for example. In such a design, the protrusion may be actually carried by the handwheel and/or the protrusion may be axially movable relative to the handwheel.

When equipping the clutch with a handwheel, this handwheel may be axially movable relative to the coupling element or the counter coupling element; the handwheel may thus perform at least part of the second axial movement of the protrusion.

In particular, the protrusion may be actually non-movable relative to the handwheel such that the protrusion and the handwheel perform the second axial movement together. Alternatively, the protrusion may be axially movable relative to the handwheel, such that the protrusion performs at least part of the second axial movement relative to the handwheel.

To achieve a compact design, the handwheel itself can form one of the coupling elements (in particular in one piece), preferably the counter coupling element.

In another suitable design, which may be used in particular as a handwheel clutch, the clutch features the coupling element designed to be engaged with another counter coupling element of another clutch, in particular a motor clutch. This may be achieved, if the counter coupling element features (at least one) other protrusion for engagement with another counter coupling element of the other clutch. In particular, this other protrusion, which can be positioned at an opposite end of the coupling element with respect to the movable protrusion of the clutch, may be designed to be engaged with a driven member of an actuator or to form a driven member of an actuator.

The counter coupling element can thus provide at least one contact face for direct engagement with the coupling element. This contact face may be oriented along the coupling axis to easily allow an engagement with the coupling element.

The motor clutch of the actuator, mentioned above, may be designed for interrupting a drivetrain from the drive motor to the driven member of the actuator.

Ideally, the protrusion is reversely movable along a coupling axis of the clutch against a restoring force provided by a restoring member. In such a design, it is preferable, if the restoring member pushes the protrusion into engagement (with the coupling element or the counter coupling element).

The element of the clutch, which carries the protrusion (this may be the counter coupling element or the coupling element, for example) can also feature a recess in which the protrusion can move axially (e.g. in and out) and relative to the element along a certain axial range. Such a free movement into and out of the recess enables a mechanism, in which said element can drive the protrusion into rotation around a coupling axis of the clutch, as long as the protrusion is within the axial range. This is because, as long as the protrusion is in the recess, the element can transmit a rotational force via the recess onto the protrusion.

To achieve the object mentioned at the beginning, there is also provided an actuator which solves the afore-mentioned problem. In particular there is provided an actuator as introduced at the beginning, further characterized in that the handwheel clutch is a clutch as described before or as disclosed herein. In particular, in this actuator design, the coupling element may be shared by both the handwheel and the motor clutch.

An additional or alternative way of distinguishing this particular actuator from known devices is thus that the motor clutch and the handwheel clutch share a common coupling element which can be switched from engagement with a counter coupling element of the motor clutch to engagement with a protrusion of the handwheel clutch, wherein this clutch is axially movable along a coupling axis of the handwheel clutch.

As has been explained above, the actuator may use different kinds of main power source such that the drive motor may be a hydraulic, pneumatic or electric drive motor.

The proposed switching may be easily achieved using a lever-arm-mechanism, as will be explained in greater detail below. Such a mechanism may be manually operated to move the common coupling element out of engagement with the motor clutch and thus to declutch the motor from the drivetrain/the output of the actuator.

Using such a switch-over mechanism, the actuator can thus be switched from a motor-driven-operation mode, in which the driven member can be driven by the drive motor, to a manual-operation-mode, in which the driven member can be manually driven by manually operating the handwheel.

Switching may be understood here as changing the engagement. This does not necessarily require a movement of the coupling element, because it is equally possible to move the respective counter coupling element relative to the coupling element.

In particular, a movable protrusion of the handwheel clutch may be axially movable along a coupling axis relative to the handwheel and/or relative to the common coupling element. In this case, it is preferable if the protrusion of the handwheel clutch is reversely movable along the coupling axis against a restoring force provided by a restoring member, and most preferably, the restoring member may push the coupling element into engagement with the counter coupling element.

In these proposed designs of an actuator, the handwheel or a member rotationally fixated to the handwheel can form the counter coupling element of the handwheel clutch, for example.

State-of-the-art designs typically do not show any movable protrusions that can be moved relative to a coupling element of the clutch to which the protrusion is attached.

In the simplest case, the driven member of the actuator, which may be either driven by the drive motor or the handwheel, may be designed as a rotatable (in particular hollow) output shaft.

Each of the two clutches formed by the respective coupling and counter coupling elements can transmit a force and/or a torque; i.e. the respective clutch may transmit a driving force or a driving torque to the driven element.

When disengaged, the coupling element and respective counter coupling element can be rotated relatively to each other around the coupling axis (relative rotation to each other); when engaged, the coupling element engaged with the respective counter coupling element are non-rotatably connected (but are still relatively movable axially against each other along the coupling axis).

As was already detailed above, the protrusion may be axially movable relative to the handwheel of the actuator to come into engagement with the coupling element. This means in particular that the coupling element itself may be axially movable relative to the handwheel to come into engagement with the protrusion of the handwheel clutch and/or into engagement with the counter coupling element of the motor clutch.

Alternatively, the counter coupling element of the motor clutch may be axially movable relative to the handwheel to come into engagement with the coupling element. However, such a design will be more complex in many application cases, as it typically requires that that the coupling element of the motor clutch is axially movable relative to the drive motor.

However, very often, it will be preferably to keep the coupling element of the motor clutch axially fixed with respect to the drive motor, as this results in a simpler drivetrain on the motor side. In the case of the latter alternative, however, the coupling element may be fixed axially on the driven element, or it may be formed integrally with the driven element (it may be the driven element). his alternative has the possible disadvantage however, that the counter coupling element of the motor clutch must be movable, which will typically result in a more complex gearbox on the motor side of the actuator.

The actuator may also be designed such that the coupling element can be driven indirectly by the handwheel via the protrusion of the handwheel clutch. This may be achieved, in particular, without direct engagement between the handwheel and the coupling element, which is advantageous, as the handwheel and the coupling element do not need to be in a particular rotational position with respect to each other to allow engagement of the handwheel clutch.

In other words, different from known solutions in the state-of-the-art, the handwheel may not drive the coupling element directly (which would require an engagement of the handwheel with the coupling element) but rather via the axially movable protrusion.

If a separate driven element (such as a drive shaft) is preferred, the coupling element may be non-rotatably connected to the driven element, for example by longitudinal serrations. In this case, the coupling element can be axially movable relative to the driven element.

In another possible design, the coupling element may be/may form the driven element; in this case, there may be no separate driven element, although the coupling element may consist of multiple parts.

According to a preferred design, the coupling element may be arranged in between the counter coupling element and the protrusion and/or the handwheel. This design may be such that the (axially movable) protrusion of the handwheel clutch can only be engaged with the coupling element as soon as the coupling element is disengaged from the counter coupling element of the motor clutch. This restriction may be achieved, for example, by limiting the axial travel of the protrusion.

For disengaging the coupling element from the counter coupling element of the motor clutch, the actuator may feature a lever-arm-mechanism that moves the coupling element axially into disengagement from the counter coupling element of the motor clutch. The counter coupling element of the motor clutch may thus be axially non-movable/fixated.

Preferably, a coupling axis of the handwheel clutch can coincide with a coupling axis of the motor clutch (co-linear design). In this case, the coupling element may thus be axially movable along the common coupling axis to allow the switching, and this may be done, preferably, against a restoring force provided by a restoring member (which can thus define a default position of the coupling element).

According to another embodiment, an axial length of a contact face of the protrusion may be longer than a maximum depth of an axial engagement between the protrusion and the coupling element. In this case, it is preferable, if the axial length is longer than the sum of a maximum depth of axial engagement between the protrusion and the coupling element and a minimum depth of axial engagement between the protrusion and a counter coupling element of the handwheel clutch. These conditions are preferred, because it allows a situation in which the protrusion is in engagement with both the coupling element and the counter coupling element, when these two elements are still axially separated from each other.

The protrusion of the handwheel clutch may be non-rotatably connected to the handwheel. If the protrusion is relatively movable axially with respect to the handwheel, which is one possible implementation, the protrusion may be axially movable in a corresponding recess of the handwheel, in particular such that the handwheel can drive the protrusion into rotation, as long as the protrusion is axially within the recess.

In addition, the protrusion of the handwheel clutch may be axially movable along a coupling axis that is common to the motor clutch and the handwheel clutch, preferably against a restoring force provided by a restoring member.

It is understood that both the motor clutch and/or the handwheel clutch may thus be designed as a dog clutch. Each dog clutch can feature, for example, one pair of a protrusion and a corresponding recess (which may be formed as a gap between two neighboring counter protrusions) designed for axial engagement with that particular protrusion. Preferably however, each dog clutch should show two pairs (or more) of corresponding protrusions and recesses/counter-protrusions, for robust transmission of a driving torque.

There is also provided a first method, which solves the afore-mentioned problem. In particular there is provided a method for engaging a coupling element and a counter coupling element of a clutch as introduced at the beginning, which is further characterized in that the coupling element and the counter coupling element are moved relative to each other in a first axial movement; this first step may be done, in particular, by moving one of the elements, preferably the coupling element, into an axial engagement position (for example by approaching it to the counter coupling element).

Furthermore, the method is characterized in that the elements are engaged with each other by moving a protrusion into an axial engagement position in a second axial movement, which is independent of the first axial movement.

This second step may be done, in particular, while the two coupling elements rest, whereas the protrusion is moving into said engagement position.

To allow the second axial movement of the protrusion, the two coupling elements may be rotated relative to each other. This will be necessary, however, only in cases in which the second axial movement is temporarily blocked, because the protrusion is in an unsuited rotational position, which may be altered by rotating the protrusion together with the element that carries the protrusion around the coupling axis of the clutch (into a coupling position).

In other words, there may be at least one relative rotational orientation between the coupling element and the counter coupling element, in which the second axial movement of the protrusion is inhibited and/or at least one relative rotational orientation between the coupling element and the counter coupling element, in which the clutch can perform the second axial movement to engage the clutch.

To achieve the object of the invention, there is also provided another method, which solves the afore-mentioned problem. In particular there is provided a method for switching between two drivetrains of an actuator (which may be designed as described previously or as disclosed herein) as introduced at the beginning, which is further characterized in that a coupling element is disengaged from a counter coupling element of a motor clutch of the actuator, thereby interrupting a first drivetrain from the drive motor to the driven member. This disengagement may be done, preferably, by axially moving the coupling element.

The method is further characterized in that a handwheel of the actuator is rotated to drive a protrusion of a handwheel clutch of the actuator around a coupling axis until the protrusion is oriented in a relative rotational coupling position with respect to the coupling element, and the protrusion is moved axially, to engage with the coupling element, thereby establishing a second drivetrain from the handwheel to the driven member. This second axial movement of the protrusion, leading to engagement of the handwheel clutch of the actuator may be, preferably, actuated by a restoring member and/or performed relative to the handwheel, because in the latter case, the handwheel does not need to move axially, but can remain static axially during the clutching.

While the steps of disengaging the motor clutch and rotating of the handwheel can be done manually, the movement of the protrusion may thus be caused automatically by a restoring member such as a compression spring.

Another possible (but less preferred) approach is to disengage the motor clutch by moving the counter coupling element of the motor clutch relative to the coupling element to interrupt the first drivetrain.

Preferably, however, the coupling element is moved axially out of engagement with the counter coupling element of the motor clutch (which can thus remain axially static) into the axial engagement position. In this position, the coupling element can then be engaged with the counter coupling element of the handwheel clutch, by moving the protrusion into its engagement position with the coupling element. The protrusion may be carried by the coupling element or by the counter coupling element (or also by both, in case multiple movable protrusions are used).

It is to be noted here, that the two methods explained above are particularly suited for use with clutches and actuators as described herein.

The approach presented herein may also be understood as suggesting to use a clutch (in particular as a component of an actuator) as detailed herein, for allowing safe switching between a motor-driven-operation mode and a manual-operation-mode, i.e. in particular for switching between a motor-driven drive-train of the actuator and a manually driven drive-train of the actuator. Due to the design of the clutch, this switching can be performed under all circumstances, with a slight rotation of the handwheel being necessary in certain circumstances, namely when the clutch is not yet in the correct rotational coupling position.

A preferred embodiment will now be described in more detail, although the present invention is not limited to this embodiment: for those skilled in the art it is obvious that further embodiments of the present invention may be obtained by combining features of one or more of the patent claims with each other and/or with one or more features of an embodiment described or illustrated herein.

BRIEF DESCRIPTION OF THE DRAWINGS

With reference to the accompanying drawings, where features with corresponding technical function are referenced with same numerals even when these features differ in shape or design

DETAILED DESCRIPTION

Figure 1:
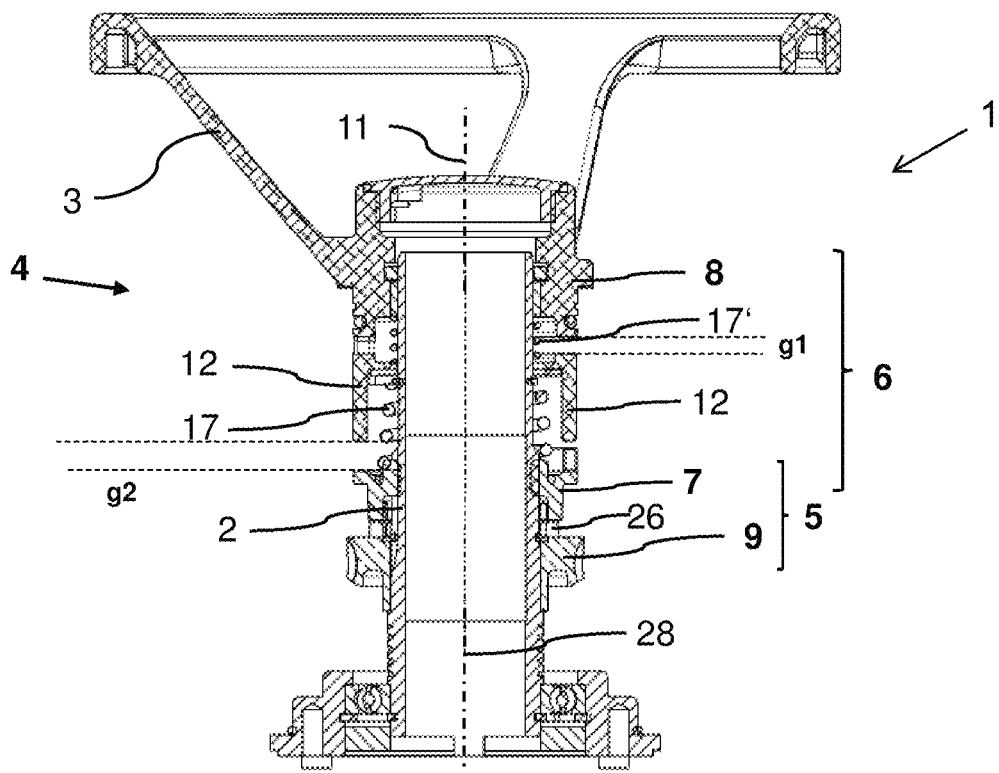
FIG. 1 is a cross-section through a motor clutch with added components that realize an additional handwheel clutch of the actuator

FIG. 1 shows some parts of a motor clutch 5 of an actuator 1 according to the invention, wherein other parts of the actuator 1 and the clutch 5 are omitted for clarity. As visible in the corresponding side view of FIG. 2, the motor clutch 5 comprises a counter coupling element 9 in the form of a worm wheel 23, which is coupled via a transmission to an electrical drive motor of the actuator 1 (all of which are not shown in the Figures) and can thus be driven electrically. The counter coupling element 9 features a number of counter protrusions 26, which are engaged with a number of protrusions 12' of an accompanying coupling element 7 that is designed as a clutch ring, as visible in FIGS. 2 and 11.

When the elements 7, 9 are engaged, they are rotationally coupled to each other (i.e. no relative rotational movement is possible) such that the drive motor of the actuator 1 can drive the coupling element 7 by driving the worm wheel 23.

Figure 2:
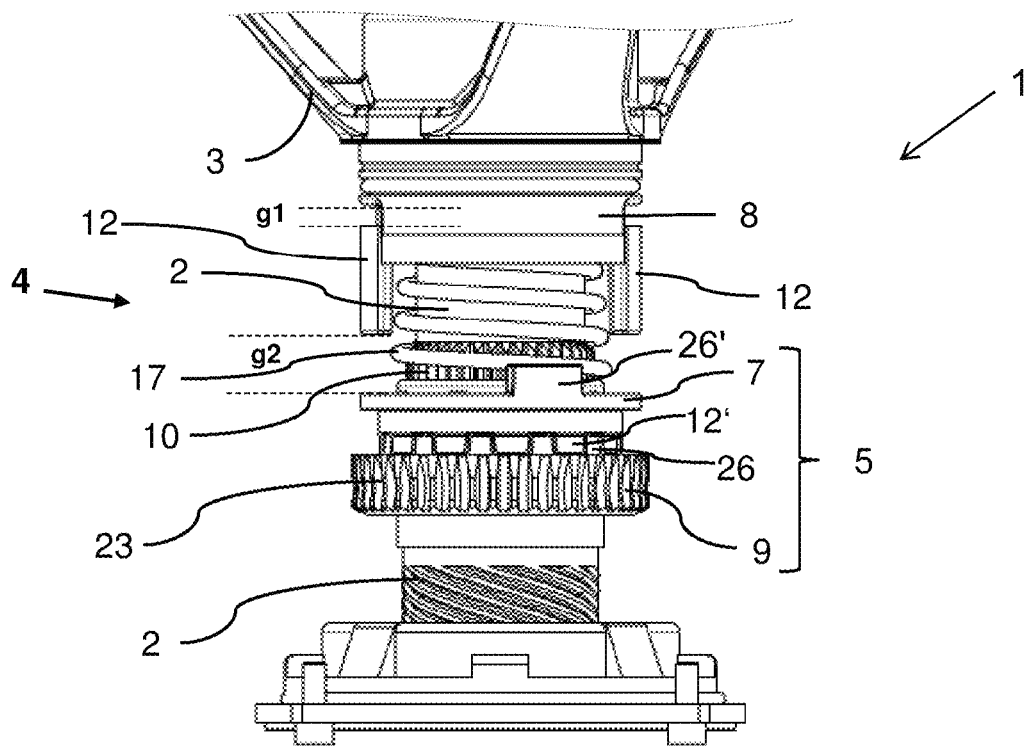
FIG. 2 is a side view on the assembly shown in FIG. 1

As is visible in FIGS. 1 and 2, the actuator 1 also comprises a driven element 2 in the form of a hollow drive shaft (cf. FIG. 1), which offers longitudinal serrations 10 on its outer surface (cf. FIG. 2). The coupling element 7, which has the shape of a ring and is mounted concentrically on the driven element 2, has a corresponding corrugation on its inner surface that is engaged in the longitudinal serrations 10. Thereby, the coupling element 7 can slide up and down along the serrations 10 in the direction of the coupling axis 28 illustrated in FIG. 1, while remaining rotationally coupled to the driven element 2 at all times.

Hence, in a situation in which the motor clutch 5 is fully engaged, the drive motor can drive the driven element 2 via elements 9 and 7. In this motor-driven operation mode, a motor-driven drive train is established starting from the drive motor of the actuator 1 and leading via the transmission, worm wheel 23, and coupling element 7 to the driven member 2.

For engaging and disengaging the motor clutch 5 formed by coupling elements 7 and 9, the actuator 1 can feature a manually operatable lever-arm-mechanism that is not shown in the Figures. Such a mechanism can produce an down/up movement of a shaft that can then be transferred by further components of the mechanism, including hinges, into a corresponding up/down movement of the coupling element 7. Therefore, when the lever of the mechanism is moved up, the clutch ring 7 may be lifted up and out of engagement with the counter coupling element 9.

The disengagement of the elements 7 and 9 caused by manually moving a lever can be performed against a restoring force that is provided by the first restoring member 17 visible in FIG. 2. This first restoring member 17 is designed as a helical mechanical spring and pushes the coupling element 7 into engagement with the counter coupling element 9, unless the lever-arm-mechanism (not shown) is used to overcome the restoring force of first restoring member 17. In other words, in the motor-driven operational mode, the motor clutch 5 is engaged by the first restoring member 17, as soon as the lever is moved accordingly.

Figure 10:
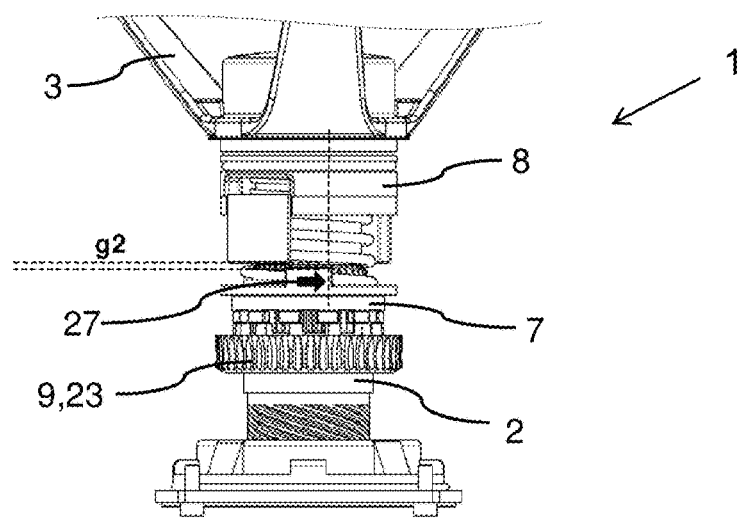
Figure 11:
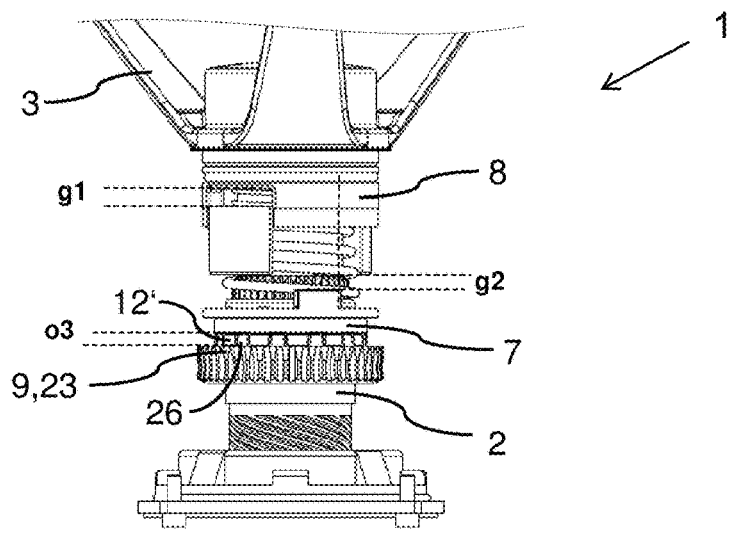

This (automatic) engagement of the motor clutch 5 is visible in FIGS. 10 and 11: In FIG. 10, the protrusions 12' of the coupling element 7 are not yet in a rotational coupling position to engage with the counter protrusions 26 of the counter coupling element 9, as illustrated in FIG. 11. To allow this engagement in the situation illustrated in FIG. 10, the coupling element 7 thus needs to rotate slightly relative to the counter coupling element 9, as illustrated by the arrow in FIG. 10 indicating this rotational movement 27 of element 7 relative to element 9. The rotational movement 27 can be performed for example, when the driven member 2 is moved, as member 2 is rotationally linked to element 7.

Figure 8:
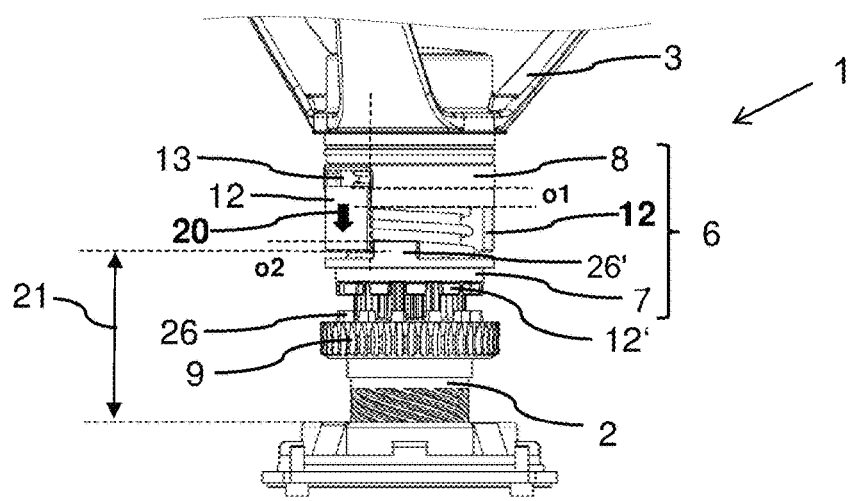
Figure 9:
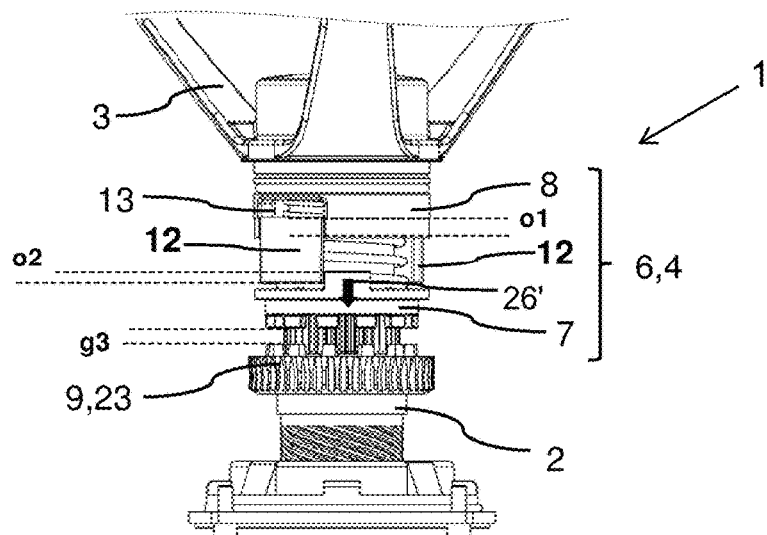

As illustrated in FIG. 1, the actuator 1 not only comprises a motor clutch 5, formed by elements 7 and 9, but also a handwheel clutch 6, formed by the (common) coupling element 7 and by a corresponding counter coupling element 8, that is rotationally coupled to the handwheel 3 illustrated in FIGS. 1 and 2. By switching the coupling element 7 from engagement with the counter coupling element 9 of the motor clutch 5 to engagement with the counter coupling element 8 of the handwheel clutch 6, the first motor-driven drivetrain can be interrupted and instead an alternative manually operated drivetrain can be established. This alternative drivetrain of the actuator 1 originates from the handwheel 3 and leads over elements 8 and 7 to the driven member 2, as soon as elements 7 and 8 are fully engaged (as illustrated in FIG. 8).

In other words, the coupling element 7 is thus axially movable upwards and relative to the handwheel 3 to come into engagement with the movable protrusion 12 of the handwheel clutch 6. At the same time, element 7 is also axially movable downwards and relative to the handwheel 3 to come into engagement with element 9 of the motor clutch 5. Hence, the coupling element 7 can thus be moved axially upwards along axis 28, which coincides with the coupling axis 11 of the handwheel clutch 6 (c.f. FIG. 1), and thus moved axially and relatively to the counter coupling element 8. This first axial movement 19 is performed by moving element 7 along the serrations 10 of the driven member 2, using the lever-arm-mechanism mentioned before.

Figure 6:
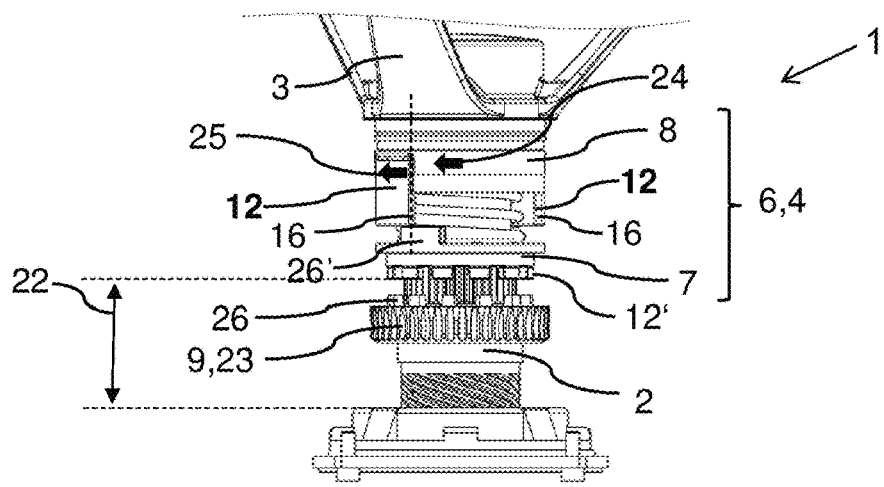

It is thus evident that the disengagement of element 7 from element 9 of the motor clutch 5 leads to an axial movement of element 7 along axis 11 and relative to element 8, which is rotationally fixed to the handwheel 3, thus moving element 7 into the axial position 22 illustrated in FIG. 6, in which elements 7 and 9 are at a maximum axial distance from each other and fully disengaged.

The design of the handwheel clutch 6 is thus characterized in that its coupling element 7 (which is part of both clutches 5 and 6) is designed to be engaged with another coupling element 9, namely with element 9 of the motor clutch 5. This is possible because element 7 not only features the two counter protrusions 26' on its upper side for engagement with element 8 but also a number of protrusions 12' on its lower side for engagement with element 9 (cf. FIG. 6).

In the specific embodiment shown in the figures, both the handwheel 3 and the counter coupling element 8 of the handwheel clutch 4, 6 (which are non-rotatably connected) are axially immobile/static. Hence the first axial movement 19, illustrated in FIGS. 10 and 11, which is required for engaging the handwheel clutch 6, is performed only by the coupling element 7. However, in other embodiments, the handwheel 3 and/or the counter coupling element 8 could be likewise axially movable such that at least part of the required first (relative) axial movement 19 between elements 7 and 8 is performed by element 8.

Figure 7:
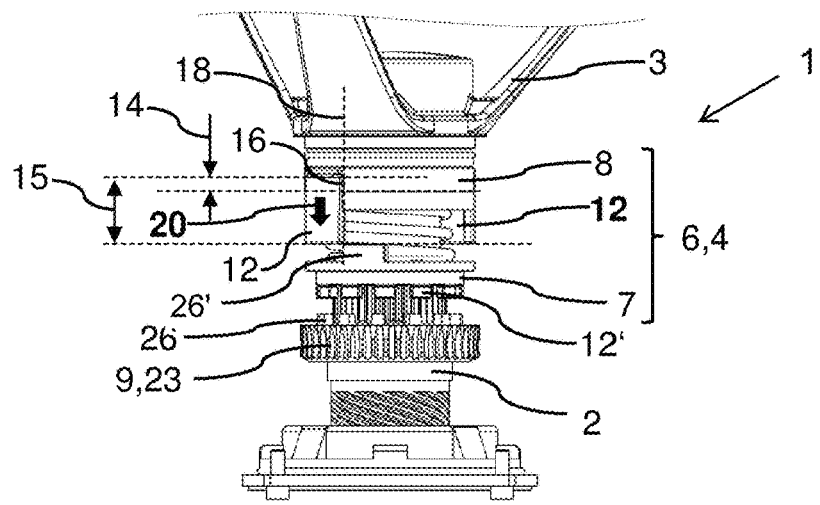

The handwheel clutch 6 forms a clutch 4 according to the invention because it features a movable protrusion 12, which can perform a second axial movement 20 that is illustrated in FIGS. 7 and 8 (see the arrow), and which is independent of the first axial movement 19. The purpose of the handwheel clutch 6 is to allow an interruption or establishment of the second drivetrain from the handwheel 3 to the driven member 2.

In the specific embodiment shown in the Figures, two movable protrusions 12 are carried by the counter coupling element 8 of the handwheel clutch 6. Different from the static protrusions 12' of the coupling element 7 or from the two upper (also static) counter protrusions 26' of element 7 (cf. FIG. 4), the movable protrusions 12 can thus move relative to the element 8 which carries it.

The second axial movement 20 of the movable protrusion 12 of the counter coupling element 8 is driven by a restoring force that is provided by a second (smaller) restoring member 17' that is visible (above the first restoring member 17 previously explained with respect to engagement of the motor clutch 5) in FIG. 1. This (upper) second restoring member 17' pushes both movable protrusions 12 downwards along axis 11, such that a gap g1 is created between an upper end of each protrusion 12 and the counter coupling element 8. This gap g1 is also visible in FIGS. 2 and 3.

As visible in FIG. 8, the counter coupling element 8 offers a recess 13 for each of the two movable protrusions 12 in which the respective protrusion 12 can move up (against the restoring force of second restoring member 17') and down (pushed down by second restoring member 17') within a limited axial range 14 illustrated in FIG. 7; hence each movable protrusion 12 is reversely movable along the coupling axis 11 of the clutch 6 against a restoring force provided by the second restoring member 17'. The recess 13, which is just slightly larger than the width of the protrusion 12, also serves the purpose of driving the protrusion 12 into rotation (which is possible in both rotational directions), as can be seen in FIG. 6.

Figure 3:
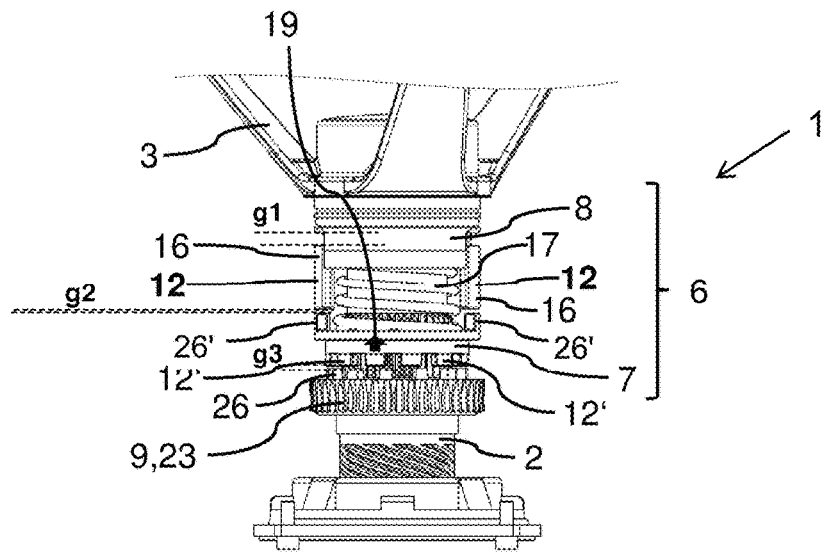
FIGS. 3 to 8 illustrate consecutively by corresponding side views as the one of FIG. 1, how the motor clutch can first be disengaged (FIGS. 3 to 5), followed by engaging the handwheel clutch (FIGS. 6 to 8), to switch between a motor-driven drivetrain and a manually operated drivetrain of the actuator, an FIGS. 9 to 11 show similar side views as the previous FIGS. 3 to 8 but now illustrating the back-switching from manual operation to motor driven operation of the actuator by re-engaging the motor clutch and thereby disengaging the handwheel clutch.
Figure 4:
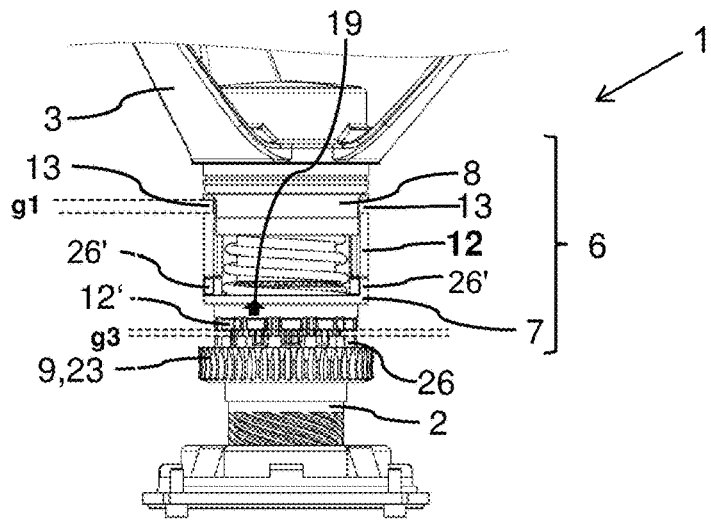
Figure 5:
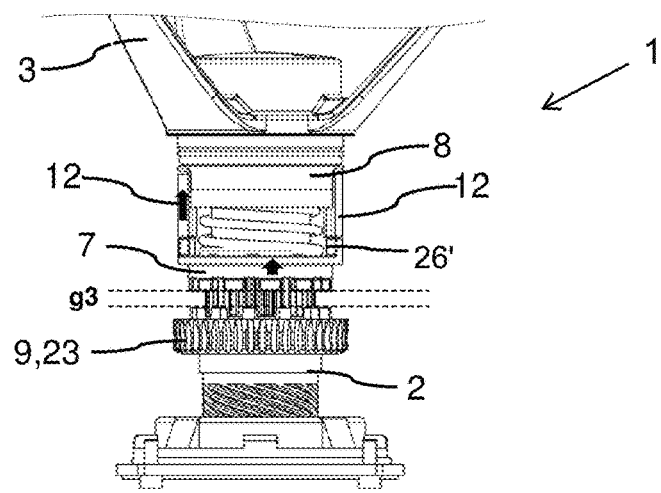

As shown is FIGS. 3 to 5, when the lever of the lever-arm-mechanism (not shown) is actuated, the coupling element 7—which is common to both clutches 5 and 6—is moved upwards along axis 28/axis 11 thus creating an increasing gap g3 between elements 7 and 9 and thus disengaging the motor clutch 5. At the same time, this disengagement forces element 7 to perform the described first axial movement 19 relative to the counter coupling element 8 of the handwheel clutch 6. Therefore, the gap g2 visible in FIG. 3 between the lower end of the movable protrusion 12 and the coupling element 7 diminishes until gap g2 vanishes completely, as illustrated in FIG. 4 (elements 7 and 12 are in contact).

If the counter protrusion 26' of element 7 is out of the angular range occupied by movable protrusions 12, protrusions 12 will remain fully pushed out (by the second restoring member 17'), and the counter protrusions 26' of element 7 can easily enter into the clearance between protrusions 12. Hence a full engagement of elements 8 and 7 (i.e. a situation as the one illustrated in FIG. 8) can be readily achieved without rotation of the handwheel 3.

In case, however, the upper counter protrusion 26' of the coupling element 7 is within the angular range occupied by the corresponding movable protrusion 12 of the counter coupling element 8, as illustrated in FIG. 6 (which is the more likely situation), further disengagement between element 7 and 9, that is further movement of element 7 axially upwards, will push the protrusion 12 upwards against the restoring force of the (smaller/upper) second restoring member 17', that is engaged with the two movable protrusions 12. In other words, the protrusions 12 will slightly retreat upwards, thus allowing the element 7 to further approach element 8 until element 7 is in the axial engagement position 22 illustrated in FIG. 6. The resulting up-movement of the protrusions 12 can be seen by comparing FIGS. 3 to 6, which show that the initial gap g1 between the upper end of protrusion 12 and the upper end of the recess 13 (cf. FIG. 4) diminishes as element 7 moves into axial position 22.

In the situation of FIG. 6, in which element 7 has reached position 22 by performing the full first axial movement 19, the handwheel 3 is slightly rotated clockwise in the rotational movement 24 illustrated in FIG. 6, thus pushing protrusion 12 into rotational movement 25. As the protrusions 12 are each still within the corresponding recesses 13 and still rotationally coupled to the element 8 via their respective contact faces 16 (cf. FIGS. 10 and 11), protrusions 12 are carried with element 8 around axis 11, thus also performing rotational movement 24. As a result, the protrusions 12 are rotated together with element 8 relatively to element 7 into the rotational coupling position 18 illustrated in FIG. 7.

In the situation of FIG. 7, when each movable protrusion 12 has reached its desired rotational coupling position 18, the protrusions 12 are within an angular range that is occupied by the clearance between the two upper counter protrusions 26' of the element 7. Hence, the (smaller/upper) second restoring member 17' will push the movable protrusions 12 into engagement with the counter protrusions 26' and thus into engagement with element 7.

In other words, the protrusions 12 will perform the second axial movement 20 illustrated in FIGS. 7 and 8 into the axial engagement position 21 illustrated in FIG. 8. This second axial movement 20 occurs independent of the first axial movement 19 of element 7 into the axial engagement position 22, and creates the overlap o2 illustrated in FIG. 8.

As soon as the protrusions 12 have reached these positions 21, and the element is in axial position 22, a force and/or torque can be transmitted between elements 7 and 8 via the protrusions 12. As is notable from FIG. 8, there is no direct engagement between elements 7 and 8. Hence, the force and/or torque is only transmitted indirectly from element 8 to element 7 by the intermediate protrusions 12.

Element 7 can thus be driven indirectly by the handwheel 3 via protrusions 12 of the handwheel clutch 6.

It is understood here, that in the case previously described, in which there is (by accident) no angular interference between the movable protrusions 12 of element 8 and the counter protrusions 26' of element 7, the second axial movement 20 can occur prior to the first axial movement 19, as the protrusions 12 can already be in the (lowest) axial engagement position 21, for example as in the situation shown in FIG. 2.

In the design shown in the Figures, the movable protrusions 12 are carried by element 8 and are movable relative to the element 8 and also relative to the handwheel 3.

An alternative design (not illustrated) which would equally achieve the desired result could feature movable protrusions similar to 12 carried by the element 7 and designed for direct engagement with counter protrusions similar to 26' of the counter coupling element 8. In such an embodiment, which also follows the approach according to the invention, the movable protrusions 12 would thus be movable relative to the coupling element 7. Of course, it is also possible to combine these two designs and thus to equip both coupling elements 7 and 8 with respective movable protrusions 12.

Another possible way of achieving the second axial movement 20 of the protrusion 12 would be to allow some degree of axial movement of the counter coupling element 8 and/or the handwheel 3. In such a case, the coupling element 7 may perform the first axial movement 19 and the counter coupling element 8 (in particular together with the handwheel 3) may perform at least part of the second axial movement 20 of the protrusions 12, independent from the first axial movement 19.

As the axial length 15 of the movable protrusions 12 (cf. FIG. 7) is longer than the sum of the maximum depth of axial engagement between protrusion 12 and coupling element 7 (corresponding to overlap o2 in FIG. 8) and a minimum depth of axial engagement between protrusion 12 and counter coupling element 8 (corresponding to overlap o1 in FIG. 8), in the situation of FIG. 8 element 8 and hence the handwheel 3 can drive element 7 via the intermediate protrusions 12. In other words, in the situation of FIG. 8, in which the handwheel clutch 6 is fully engaged, each movable protrusion 12 can transmit a driving force from elements 8/3 to element 7 and hence finally to the driven member 2. Therefore, when the handwheel clutch 6 is fully engaged, the driven member 2 may be actuated by rotating the handwheel 3 manually, while the counter coupling element 9 can remain rotationally static, fixed in place by the transmission and drive motor of the actuator 1 coupled to element 9.

The advantage of the movable protrusions 12 is thus that-no matter the relative rotational position between elements 7 and 8-engagement of the handwheel clutch 6 is always possible, at least after performing a slight rotational movement 24 with the handwheel 3 (as illustrated in FIG. 6) to rotate the protrusions 12 into a suitable rotational coupling position 18.

The sequence of axial movement 19 of element 7 relative to element 8 derivable from FIGS. 2 to 6, followed by the second independent axial movement 20 of protrusions 12 relative to elements 7 and 8 illustrated in FIGS. 7 and 8 as well as the rotation 24 of protrusions 12 relative to element 7 shown in FIG. 6 also illustrate the single steps of the method for engaging the clutch 6 according to the invention: By moving element 7 upwards, element 7 is first disengaged from element 9 of motor clutch 5, thereby interrupting the first drivetrain from the drive motor to the driven member 2; by rotating the handwheel 3 as shown in FIG. 6, the protrusions 12 are then driven around axis 11 until protrusions 12 are oriented in a relative rotational coupling position 18 with respect to element 7; finally, the protrusions 12 are pushed axially down by the second restoring member 17', to engage with element 7, which finally establishes the desired second drivetrain from the handwheel 3 to the driven member 2.

In summary, for improving manual operation of an actuator 1, a novel clutch 4, 6 is proposed that features at least one movable protrusion 12 that is axially movable along a coupling axis 11 of the clutch 4, 6 relative to an element 8 that carries the protrusion 12. This design has the advantage that engagement of the clutch 4, 6 is possible under all circumstances, even in cases in which the protrusion 12 is not yet in a correct rotational coupling position 18 (cf. FIG. 7), as the protrusion 12 can be transferred into the coupling position 18 by a rotational movement 24, 25 at all times (cf. FIG. 6).

LIST OF REFERENCE NUMERALS 1 actuator
2 driven member
3 handwheel
4 clutch
5 motor clutch
6 handwheel clutch
7 coupling element
8 counter coupling element (of 6)
9 counter coupling element (of 5)
10 longitudinal serrations
11 coupling axis (of 6)
12 protrusion
12 static protrusion
13 recess (in 3)
14 axial range (in which 12 is axially movable relative to 3)
15 axial length (of 16)
16 contact face
17 the first restoring member
17' the second restoring member
18 rotational coupling position
19 first axial movement (of 8 or 9)
20 second axial movement (of 12)
21 axial engagement position (of 12)
22 axial engagement position (of 7 or 8)
23 worm wheel
24 rotational movement (of 3)
25 rotational movement (of 12)
26 counter protrusion (of 9)
26' counter protrusion (of 7)
27 rotational movement (of 7)
28 coupling axis (of 5)

The invention claimed is:

1. An actuator (1) for actuating a control element by a driven member (2) of the actuator (1), the actuator (1) comprising,
a drive motor;
a handwheel (3);
a motor clutch (5) for interrupting a first drivetrain from the drive motor to the driven member (2);
a handwheel clutch (6) for interrupting a second drivetrain from the handwheel (3) to the driven member (2);
a common coupling element (7) shared by the motor clutch (5) and the handwheel clutch (6), the common coupling element (7) is switchable using a manually operable lever-arm-mechanism from
a) engagement with a counter coupling element (9) of the motor clutch (5) to
b) engagement with a protrusion (12) of the handwheel clutch (6) that is axially movable along a coupling axis (11) of the handwheel clutch (6);
the handwheel clutch (6) is formed by the common coupling element (7) and by a corresponding counter coupling element (8) that is rotationally coupled to the handwheel (3);
the common coupling element (7) is moveable axially and relatively to the counter coupling element (8) of the handwheel clutch (6) along longitudinal serrations (10) of the driven member (2) in a first axial movement (19), using said lever-arm-mechanism; and
the protrusion (12) of the handwheel clutch (6) is arranged to perform a second axial movement (20) independent of the first axial movement (19).

2. The actuator (1) according to the claim 1, wherein at least one of a) the common coupling element (7) and the counter coupling element (8) of the handwheel clutch (6) are movable relative to each other in the first axial movement (19) to engage or disengage, or b) at least one of the common coupling element (7) or the counter coupling element (8) of the handwheel clutch (6) is movable into an axial engagement position (22) by the first axial movement (19).

3. The actuator (1) according to the claim 2, wherein the protrusion (12) is movable into an axial engagement position (21) by the second axial movement (20).

4. The actuator (1) according to the claim 3, wherein at least one of a force or torque is transmittable between the common coupling element (7) and the counter coupling element (8) of the handwheel clutch (6), as soon as the protrusion (12) is in the axial engagement position (21).

5. The actuator (1) according to claim 1, wherein the protrusion (12) is adapted for direct engagement with the common coupling element (7).

6. The actuator (1) according to claim 5, wherein the protrusion (12) is at least one of a) carried by the counter coupling element (8) of the handwheel clutch (6), b) movable relative to the counter coupling element (8) of the handwheel clutch (6), or c) adapted for direct engagement with the counter coupling element (8) of the handwheel clutch (6).

7. The actuator (1) according to claim 1, wherein the handwheel (3) is non-rotatably connected to the counter coupling element (8) of the handwheel clutch (6) or the common coupling element (7), and the protrusion (12) is at least one of carried by the handwheel (3) or is axially movable relative to the handwheel (3).

8. The actuator (1) according to claim 1, wherein the handwheel (3) is axially movable relative to the common coupling element (7) or the counter coupling element (8) of the handwheel clutch (6) and is adapted to perform at least part of the second axial movement (20), and the protrusion (12) is non-movable relative to the handwheel (3) such that the protrusion (12) and the handwheel (3) perform the second axial movement (20) together or the protrusion (12) is axially movable relative to the handwheel (3).

9. The actuator (1) according to claim 1, wherein the common coupling element (7) is at least one of a) engageable with the counter coupling element (9) of the motor clutch (5) by featuring another protrusion (12') for engagement with the counter coupling element (9) of the motor clutch (5), or b) engageable with the driven member (2) of the actuator (1) or to form a driven member (2) of an actuator (1).

10. The actuator (1) according to claim 1, wherein the protrusion (12) is reversely movable along a coupling axis (11) of the handwheel clutch (6) against a restoring force provided by a restoring member (17').

11. The actuator (1) according to claim 10, wherein the restoring member (17') pushes the protrusion (12) into engagement with the common coupling element (7).

12. The actuator (1) according to claim 1, wherein the common coupling element (7) carrying the protrusion (12) include a recess (13) in which the protrusion (12) is moveable axially and relative to the common coupling element (7) along an axial range (14).

13. The actuator (1) according to claim 12, wherein the common coupling element (7) drives the protrusion (12) into rotation around a coupling axis (11) of the handwheel clutch (6), as long as the protrusion (12) is within the axial range (14).

14. The actuator (1) according to claim 1, wherein the protrusion (12) is axially movable relative to the handwheel (3) to come into engagement with the common coupling element (7).

15. The actuator (1) according to claim 14, wherein the common coupling element (7) is axially movable relative to the handwheel (3) to come into engagement with at least one of the protrusion (12) of the handwheel clutch (6) or the counter coupling element (9) of the motor clutch (5).

16. The actuator (1) according to claim 14, wherein the counter coupling element (9) of the motor clutch (5) is axially movable relative to the handwheel (3) to come into engagement with the common coupling element (7).

17. The actuator (1) according to claim 1, wherein the common coupling element (7) is drivable indirectly by the handwheel (3) via the protrusion (12) of the handwheel clutch (6).

18. The actuator (1) according to claim 17, wherein the common coupling element (7) is drivable without direct engagement between the handwheel (3) and the common coupling element (7).

19. The actuator (1) according to claim 1, wherein the common coupling element (7) is arranged in between the counter coupling element (9) of the motor clutch (5) and the protrusion (12) or the handwheel (3), such that the protrusion (12) of the handwheel clutch (6) is only engageable with the common coupling element (7) as soon as the common coupling element (7) is disengaged from the counter coupling element (9) of the motor clutch (5).

20. The actuator (1) according to claim 1, wherein an axial length (15) of a contact face (16) of the protrusion (12) is longer than a maximum depth of axial engagement between the protrusion (12) and the common coupling element (7).

21. The actuator (1) according to claim 20, wherein the axial length (15) is longer than a sum of a maximum depth of axial engagement between the protrusion (12) and the common coupling element (7) and a minimum depth of axial engagement between the protrusion (12) and the counter coupling element (8) of the handwheel clutch (6).

* * * * *